United States Patent [19]

Herzl

[11] 4,005,604
[45] Feb. 1, 1977

[54] NON-CONTACT SENSOR FOR VORTEX-TYPE FLOWMETER

[75] Inventor: Peter J. Herzl, Morrisville, Pa.

[73] Assignee: Fischer & Porter Co., Warminster, Pa.

[22] Filed: Sept. 30, 1975

[21] Appl. No.: 618,277

[52] U.S. Cl. .......................................... 73/194 VS
[51] Int. Cl.² .......................................... G01F 1/32
[58] Field of Search ............... 73/70.2, 71,2, 71.4, 73/194 VS; 310/25

[56] References Cited
UNITED STATES PATENTS

| | | | |
|---|---|---|---|
| 2,809,520 | 10/1957 | Richard, Jr. | 73/194 X |
| 2,945,379 | 7/1960 | Barnes et al. | 73/517 |
| 3,025,461 | 3/1962 | Snellen | 73/517 X |
| 3,060,370 | 10/1962 | Varterasian | 73/517 |
| 3,116,639 | 1/1964 | Bird | 73/194 |
| 3,683,691 | 8/1972 | Kivenson | 73/194 |
| 3,698,245 | 10/1972 | McNabb | 73/194 |
| 3,720,104 | 3/1973 | Zanker | 73/194 |

Primary Examiner—Herbert Goldstein

[57] ABSTRACT

A non-contact sensor for a vortex-type flowmeter in which the fluid to be measured is conducted through a flow tube having an obstacle assembly mounted therein capable of generating fluidic oscillations causing a deflectable section of the assembly to vibrate at a corresponding rate. These vibrations are sensed to produce an output signal whose frequency is proportional to the flow rate of the fluid, the sensor being constituted by a magnetically-dependent member which is subjected to a changing magnetic field by a proximity element attached to the deflectable section and vibrating therewith to induce in the member electrical changes producing said output signal.

8 Claims, 7 Drawing Figures

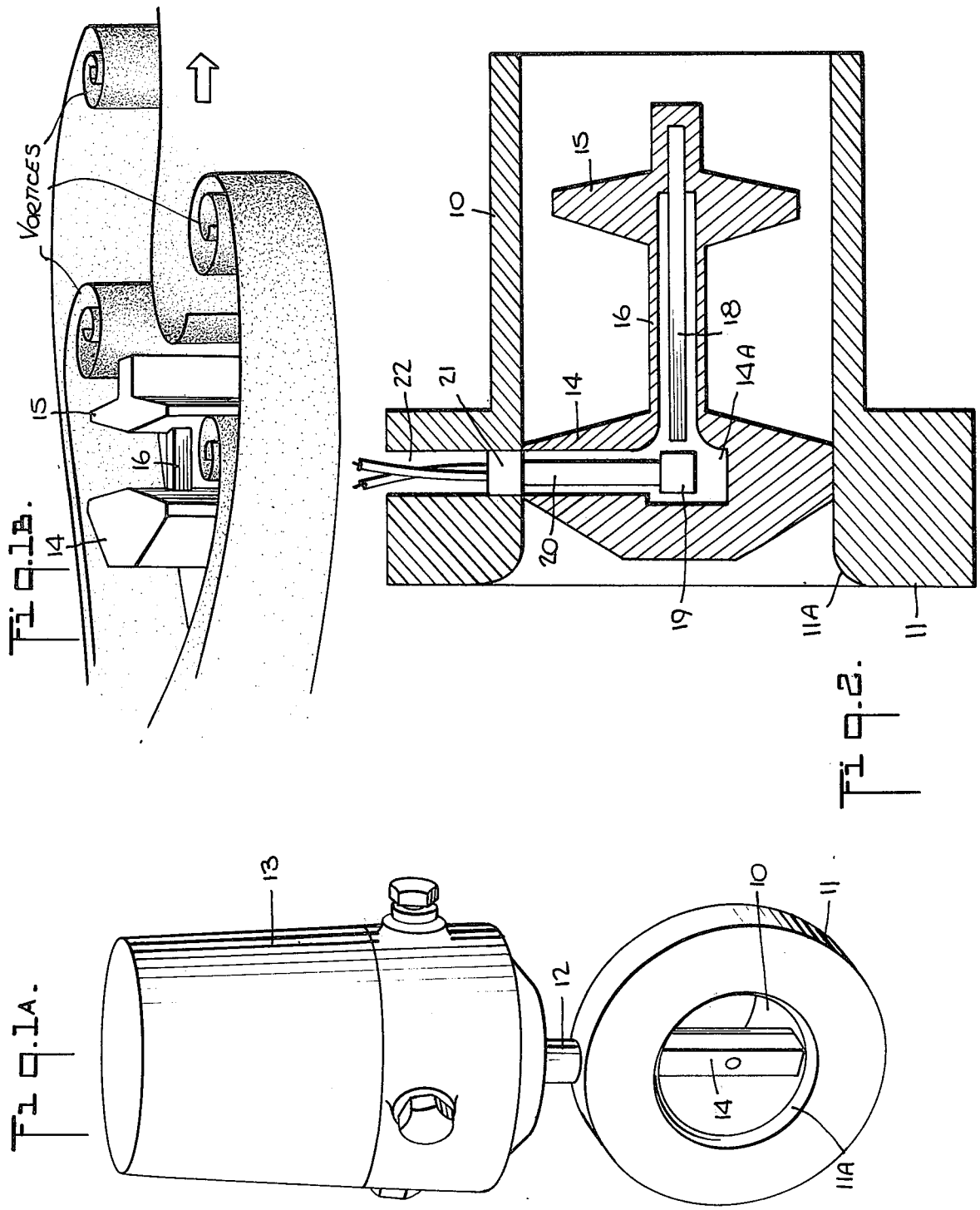

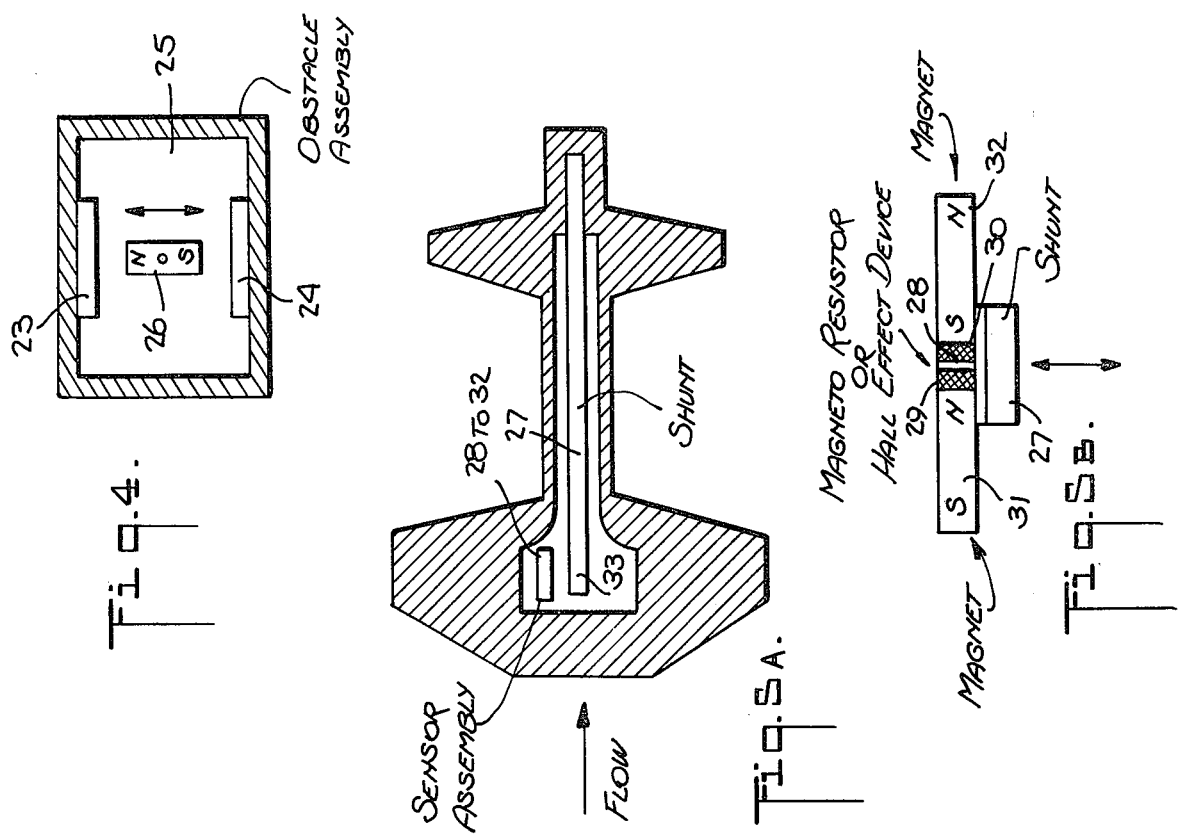
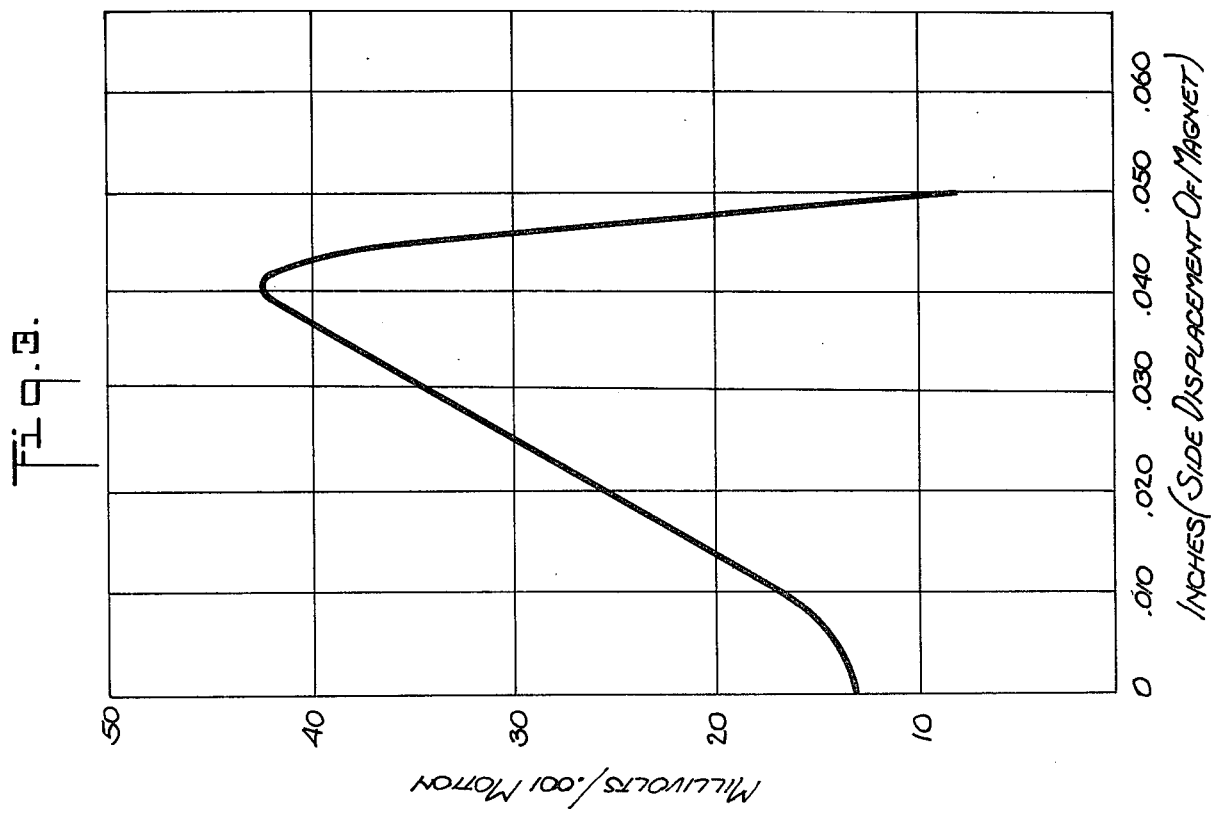

NON-CONTACT SENSOR FOR VORTEX-TYPE FLOWMETER

BACKGROUND OF THE INVENTION

This invention relates generally to flowmeters of the vortex-shedding type which includes a deflectable section excited into vibration by fluidic oscillations, and more particularly to a vortex meter in which the vibrations of the deflectable section are picked up by a sensor which makes no physical contact therewith.

In many industrial processes, one must be able to measure the volumetric flow of fluids being treated or supplied in order to carry out various control functions. It is also necessary, in some instances, to determine the mass flow of the fluids. Existing types of vortex flowmeters are capable of effecting volumetric flow or mass flow measurement.

It is well known that under certain circumstances the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate. In order to convert a volumetric reading to a reading of mass flow, one must multiply the volume measurement by the density of the fluid being measured.

An improved form of vortex-type flowmeter is disclosed in Burgess U.S. Pat. No. 3,589,185 wherein the signal derived from the fluid oscillation is relatively strong and stable to afford a favorable singal-to-noise ratio insuring accurate flow-rate information over a broad range. In this meter, the obstacle assembly mounted in the flow conduit is constituted by a block positioned across the conduit with its longitudinal axis at right angles to the direction of fluid flow, a strip being similarly mounted behind the block and being spaced therefrom to define a gap which serves to trap Karman vortices and to strengthen and stabilize the vortex street. This vortex street is sensed to produce a signal whose frequency is proportional to flow rate.

In a later Burgess U.S. Pat. No. 3,888,120, the disclosure of which is incorporated herein by reference, the obstacle assembly is formed by a front section mounted across the flow tube and a rear section cantilevered from the front section by means of a flexible beam to define a gap serving to trap the Karman vortices. Because the rear section is deflectable, it is excited into mechanical vibration by the vortices at a rate whose frequency is proportional to fluid flow. This vibratory motion is sensed by a strain-gauge sensor.

In the Vortex Flowmeter Model 10 LV 1000 manufactured by the Fischer & Porter Company of Warminster, Pa., the assignee of Burgess U.S. Pat. No. 3,888,120 as well as of the present application, a DSC-6 strain-gauge cartridge is used to sense the deflection of a T-shaped rear section in relation to the fixed front section of an obstacle assembly mounted in a flow tube. The DSC-6 strain-gauge sensor is constituted by a steel beam having a pair of high-impedance, semi-conductor strain gauges glass-bonded thereto. The characteristics of these gauges are such as to give rise to resistance changes of 0.66% for a 0.001 inch deflection at the tip of the cartridge.

While a strain-gauge sensor of the DSC-6 type is highly sensitive and operates effectively in vortex-shedding flowmeters, these sensors possess certain practical disadvantages.

In the manufacture of a strain-gauge sensor, it is important when bonding the gauges to the steel beam to avoid any physical deformation of the gauges, for such deformation acts to pre-stress the gauges and to impair their performance characteristics. It must be borne in mind that the deflectable section of the flowmeter, in the course of vibration, subjects the strain gauges to millions of vibratory cycles. Indeed, the Burgess U.S. Pat. No. 3,888,120 points out that in one example of a vortex flowmeter in continuous operation, the number of vibratory cycles per year is about 700 million.

In order, therefore, for the strain gauge to have an adequate fatigue life and to avoid overstressing effects that might result in the destruction of the strain gauge, great care must be exercised in bonding the gauge to the steel beam and in installing the strain gauge sensor in the meter to prevent gauge deformation. This adds substantially to manufacturing and installation costs.

Another drawback of strain gauge sensors is that in meters for measuring fluids such as liquid air or liquid nitrogen whose temperatures lie in the cryogenic range, such sensors are rendered inoperative by the extreme cold. Still another practical disadvantage is that semiconductor strain gauge sensors have a relatively high impedance and the circuits associated therewith therefore tend to pick up extraneous noise voltages which degrade the performance of the measuring system.

SUMMARY OF INVENTION

In view of the foregoing, it is the main object of this invention to provide an improved sensor for a vortex-type flowmeter having a deflectable section, the sensitive member of the sensor being physically decoupled with respect to the deflectable section, whereby the sensor is not subject to fatigue and is free of the drawbacks characteristic of existing types of strain gauge and other sensors which are mechanically in control with the deflectable section.

More particularly, an object of this invention is to provide a non-contact sensor for a vortex-type meter, the sensor having a magnetically-dependent member that is subjected to a changing magnetic field by a proximity element attached to the deflectable section of the meter and vibrating therewith to induce in the member a change in resistance or other electrical value to produce an output signal proportional to flow rate.

Among the advantages of a non-contact sensor in accordance with the invention is that it is relatively inexpensive to manufacture and install, it is highly sensitive and has a high order of reliability. Also, the sensor has a low impedance and the associated circuits are less responsive to extraneous voltages.

Yet another object of the invention is to provide a non-contact sensor for a vortex-type flowmeter having a deflectable section, which sensor lends itself to easy replacement in the event it is accidentally damaged or rendered inoperative.

Briefly stated, these objects are attained in a sensor for a vortex meter in which the fluid to be measured is conducted through a flow tube having an obstacle assembly mounted therein capable of generating fluidic oscillations which cause a deflectable section of the assembly to vibrate at a corresponding rate.

These vibrations are sensed by a non-contact sensor to produce an output signal whose frequency is proportional to the flow rate of the fluid, the sensor being constituted by a magnetically-dependent member which may take the form of a magneto-resistor or a Hall-effect device, and a proximity element attached to the deflectable section and non-mechanically associated with the member to change the magnetic field to which it is subjected in accordance with the vibrations of the deflectable section, thereby inducing in the member electrical changes producing said output signal.

OUTLINE OF DRAWING

For a better understanding of the invention as well as other objects and further features thereof, reference is made to the following detailed description to be read in conjunction with the accompanying drawings, wherein:

FIG. 1A is a perspective view of a vortex-type flowmeter which incorporates a preferred embodiment of a non-contact sensor in accordance with the invention;

FIG. 1B illustrates the nature of the vortices generated in the flowmeter;

FIG. 2 is a section taken through the obstacle assembly of the flowmeter to expose the sensor therein;

FIG. 3 is a curve showing the relationship between the displacement of a proximity element and a magnetically-dependent member of the Hall-effect type;

FIG. 4 schematically shows another embodiment of a non-contact sensor in a vortex-type flowmeter;

FIG. 5A schematically shows a third embodiment of a non-contact sensor in a vortex-type flowmeter; and FIG. 5B separately shows the sensor in the third embodiment.

DESCRIPTION OF INVENTION

Referring now to the drawings and more particularly to FIGS. 1A, 1B and 2, there is shown a vortex-shedding flowmeter which incorporates a preferred embodiment of a non-contact sensor in accordance with the invention, the meter including a flow tube 10 through which is conducted the fluid whose flow rate is to be measured. Tube 10 is provided at its inlet side with a flange 11 of enlarged outer diameter. The inlet 11A of the flow tube is chamfered to provide a smooth flow transition from the upstream pipe. Mounted vertically on flange 11 by a stub pipe 12 is a signal conditioner housing 13, the signal conditioner being coupled through the stub pipe to the sensor within the flowmeter.

This flowmeter is installed in the manner disclosed in greater detail in the copending application of Burgess Ser. No. 493,855, filed Aug. 1, 1974, by interposing it in a flow line constituted by an upstream pipe section and a downstream pipe section. The two pipe sections have complementary mounting flanges and a circular series of bores therein to accommodate bolts.

The meter is installed by telescoping flow tube 10 into the downsteam pipe section and then clamping meter flange 11 between the upstream and downstream mounting flanges by means of the bolts intercoupling the pipe flanges which form a cage encircling and abutting the periphery of the meter flange and acting to center the flow tube within the down-stream pipe section. Gaskets are sandwiched between the meter flange and the pipe flange to prevent fluid leakage.

Mounted within flow tube 10 is an obstacle assembly formed by a contoured front section 14 and a T-shaped rear section 15 cantilevered from the front section by a hollow beam 16 which is slightly flexible. Front section 14 is a contoured block having a delta-shaped cross-section which is uniform throughout the longitudinal axis of the block, this axis being perpendicular to the flow axis of the flow tube. The extremities of front section 14 are attached to the wall of flow tube flange 11, whereby the front section is fixedly held within the flow tube, whereas rear section 15 of the obstacle assembly is free to vibrate.

The apex of front secton 14 faces the incoming fluid, the inclined sides thereof forming leading edges which are swept by the flow of fluid and divide the stream to create a series of vortices that alternate with respect to the center line of the front section. As the vortices detach themselves from the front section, alternate areas of low pressure are created that shift from side to side, producing an oscillating thrust behind the front section and causing the deflectable rear section to vibrate at a frequency that is linearly proportional to the incoming fluid velocity.

The function of the sensor is to sense this frequency to produce a signal which is processed by the signal conditioner in housing 13 to provide an output signal indicative of the volumetric flow rate.

The sensor in accordance with the invention is constituted by a proximity element in the form of a rod-shaped permanent magnet 18, the rear end of which is anchored in the tail of rear section 15, the rod magnet extending through the hollow interior of beam 16 with its front end passing into a chamber 14A formed within front section 14.

Disposed within chamber 14A is a magnetically dependent member 19 which is supported on the end of a hollow post 20 extending from a mounting base 21 received within a lateral bore 22 in flow tube flange 11, the bore communicating with chamber 14A in the front section. The leads for member 19 pass through the post and base and pass into the housing of the signal conditioner. The mounting arrangement for member 19 is such that it may readily be inserted in the flowmeter or withdrawn therefrom for replacement.

The magnetically-dependent member may take the form of a magnetically biased magneto-resistor such as the Magneto Resistor FP 100 L 100 manufactured by the Siemens Company of Germany, which consists of In-So/Ni-Sb and has a basic resistance of approximately 115 ohms. A permanent magnet included with the resistor acts to bias the resistor 0.6 Telsa so that it operates in the linear portion of its characteristic curve. Thus the sensor has a low impedance.

Magneto-resistors are magnetically-dependent semi-conductive resistors made of indium antimonide-nickel antimonide. When placed in a magnetic field, their resistance increases regardless of the polarity of the field. Since current and voltage are directly proportional in a magnetic field, a magneto-resistor presents a real resistance.

The semi-conductor possesses metallic conducting domains in needle-like form in a parallel array, the distance between domains being a few thousandths of a millimeter. If a voltage is imposed across the resistor, then a current flows therein in a direction normal to the needle-like domains when there is no magnetic field applied to the resistor. But if a magnetic field is established in a plane intersecting at right angles the plane containing the array of domains, the current paths are deviated by the Hall-angle in relation to the direction without a magnetic field, as a result of which the current path is rendered sinuous and becomes longer, causing an increase in ohmic resistance.

In the sensor arangement shown in FIG. 2, the magnetic lines of flux emanating from the inner end or head of rod magnet 18 are substantially perpendicular to the plane containing the magneto-resistor 19 when deflectable section 15 of the obstacle assembly is stationary. But when this section vibrates, the lines of flux swing back and forth with respect to the resistor plane to produce a change in resistance value which alternates at the frequency of deflection.

The change in resistance may be converted into an alternating voltage whose frequency is proportional to the flow rate by inserting the magneto-resistor in a bridge circuit which is balanced to provide a null output when the deflectable section is stationary.

The mechanical tolerances required to obtain effective magnetic coupling between the proximity element 18 and the magneto-resistor 19 are relatively wide and are therefore not in the least critical. Hence there are no critical requirements in installing the magnetically-dependent member within the flowmeter. The cost of magneto-resistor sensors, particularly when one considers expenditures involved in installation, are much lower than that of a strain gauge sensor.

In lieu of a magneto-resistor, one may use a magnetically-operated Hall-effect sensor, such as the 63 SS 2-1 and 63 SS 2C analog magnetic field sensors manufactured by the Honeywell Company. Such sensors feature linear outputs with high output voltages and low supply currents, for they operate on only 3.5 to 4.8 milliamperes and can be directly connected to a 4 to 10 VDC supply without additional components. The Hall-effect refers to the generation of a voltage across opposite edges of a current-carrying electrical conductor carrying current placed in a magnetic field. Because of the Hall-effect, a variation in the magnetic field with respect to the conductor will change the output voltage accordingly.

Thus, as shown by the curve in FIG. 3, when a rod-shaped magnet is displaced from one side to another relative to a Hall-effect device operating at 8 volts, this motion is translated into a corresponding change in output voltage. In the example illustrated, a peak of over 40 millivolts is reached at 0.040 inches, and the voltage from the device drops sharply as one shifts to either side of this point. It will be evident, therefore, that the Hall-effect device is a highly-sensitive sensor.

In lieu of a single magneto-resistor or magnetically operated Hall-effect device, one may, as shown in FIG. 4, mount a pair of such devices 23 and 24 within a cavity 25 formed in an obstacle assembly having a deflectable section. It is to be understood that a sensor in accordance with the invention is not limited in its application to vortex meters of the type disclosed herein, but may be used with any vortex-shedding flowmeter in which a section, vane, diaphragm or ay other element is set into vibration by the fluidic oscillations at a rate proportional to the flow rate of the fluid.

Devices 23 and 24 operate in a differential manner with respect to a bar magnet 26 which is mechanically coupled to the deflection element of the assembly so that as one pole of the magnet approaches one device in the course of a swing, the opposite pole is concurrently withdrawn from the other device. The output of these devices may be applied to a differential amplifier to produce a signal proportional to flow rate.

Still another arrangement is shown in FIG. 5 wherein the proximity element 27 attached at its outer end to the deflectable section, instead of being a permanent magnet, is a rod fabricated of ferromagnetic material such as soft iron. Mounted adjacent one side of the vibrating inner end of element 27 is a sensor assembly including a magnetically dependent device 28, which may be a magneto-resistor or a Hall-effect device, sandwiched between a pair of soft iron pieces 29 and 30. Attached to these pieces are a pair of permanent magnet rods 31 and 32, all of the components of the sensor assembly being colinear and being bonded together to form a unitary structure which may be installed without difficulty within cavity 33.

The lines of flux extending between magnets 31 and 32 and passing through soft iron pieces 29 and 30 and the sensitive device 28 permanently bias this device. Proximity element 27, which is formed of soft iron, swings back and forth with respect to one side of the sensor assembly. As element 27 approaches the sensor assembly, some of the lines of magnetic flux from the permanent magnets, instead of passing through the sensitive device 28, are diverted by element 27 which acts as a by-pass shunt, thereby diminishing the field to which device 28 is subjected and changing the output thereof.

In practice, instead of soft iron pieces 29 and 30, one may use pieces of insulating material so that sensitive device 28 is disposed within gaps in the magnetic field. The arrangement in FIG. 5 is relatively insensitive to motion in line with the magnets, for this motion does not materially alter the field gaps. This is desirable, for such in-line motion does not reflect a vortex-shedding action.

In constructing a vortex-shedding meter, all manufacturing procedures may be completed before the magnetically dependent sensor is installed therein. This is a significant advantage, for it makes it feasible to subject the meter body in the course of manufacture to high temperatures which may involve heat treatment, welding and tantalum coating to improve the ability of the meter to withstand corrosive fluids or cryogenic temperatures without, however, damaging the sensor.

While there have been shown and described preferred embodiments of non-contact sensors for a vortex-type flowmeter in accordance with the invention, it will be appreciated that many changes and modifications may be made therein without, however, departing from the essential spirit thereof.

I claim:

1. A non-contact sensor for a vortex-shedding flowmeter having an obstacle assembly mounted in a flow tube which intercepts the fluid passing therethrough and gives rise to vortices, to cause a deflectable section of the assembly to vibrate at a frequency proportional to the flow rate of the fluid, said assembly including a fixed section mounted across the flow tube, the deflectable section being cantilevered from the fixed section by a hollow, flexible beam, said sensor comprising:

A. a magnetically-dependent device which when subjected to a varying magnetic field produces a corresponding varying electrical value, said device being disposed within a cavity in said front section which communicates with said hollow beam and is accessible by way of a passage extending through said fixed section and said tube, and B. a proximity element enclosed in said hollow beam mechanically coupled to said deflectable section and vibrating therewith, the free end of said element being disposed adjacent to said device in said cavity but out of contact therewith and being adapted to vary the magnetic field to which the device is subjected in accordance with said vibrations, whereby the device produces a signal indicative of said flow rate.

2. A sensor as set forth in claim 1, wherein said element is a permanent magnet in rod form which extends through said hollow beam, one end of which is anchored in said deflectable section, the other end being adjacent said device to subject said device to a varying magnetic field.

3. A sensor as set forth in claim 1, wherein said device is a magneto-resistor.

4. A sensor as set forth in claim 1, wherein said device is a Hall-effect device.

5. A sensor as set forth in claim 1, constituted by a pair of said devices in spaced relation and wherein said proximity element is constituted by a permanent magnet, one pole of which is adjacent one of said devices and the other pole of which is adjacent the other of said devices, said magnet being mounted at the end of a rod which extends through said hollow beam and is anchored in said deflectable section.

6. A sensor as set forth in claim 1, wherein said device is constituted by a pair of spaced colinear permanent magnets having a magnetically-dependent member disposed in the gap therebetween and said proximity element adjacent said member acts as a by-pass shunt with respect to the magnetic field extending through said gap.

7. A sensor as set forth in claim 6, wherein said element is of soft iron.

8. A sensor as set forth in claim 6, wherein said gap is filled with soft iron.

* * * * *

UNITED STATES PATENT OFFICE
CERTIFICATE OF CORRECTION

PATENT NO. : 4,005,604
DATED : February 1, 1977
INVENTOR(S) : Peter J. Herzl

It is certified that error appears in the above-identified patent and that said Letters Patent are hereby corrected as shown below:

Column 1, line 33 "singal" should have read -- signal --

Column 4, line 46 "So" should have read -- Sb --

Column 5, line 58 "ay" should have read -- any --

Signed and Sealed this

Twelfth Day of April 1977

[SEAL]

Attest:

RUTH C. MASON
*Attesting Officer*

C. MARSHALL DANN
*Commissioner of Patents and Trademarks*